Inventor
Max Anderes

United States Patent Office 3,435,932
Patented Apr. 1, 1969

3,435,932
OVERLOAD CLUTCH FOR MACHINE TOOLS,
PARTICULARLY LATHES
Max Anderes, Baar, Switzerland, assignor to Oerlikon
Buhrle Holding Ltd., Zurich, Switzerland
Filed Mar. 16, 1967, Ser. No. 623,658
Claims priority, application Switzerland, Mar. 25, 1966,
4,380/66
Int. Cl. F16d 23/00, 7/02, 43/20
U.S. Cl. 192—56                              3 Claims

ABSTRACT OF THE DISCLOSURE

An overload clutch which comprises two clutch members pressed against one another by spring force through a toggle joint, which a bell-crank lever in the event of overloading, breaks sharply. The toggle joint is straight when the clutch is engaged. The clutch members have clutch faces which are inclined with respect to the direction of a movement to be transmitted by the clutch. These clutch faces produce, from the force to be transmitted by the clutch, a component of force which counteracts the spring force and which, at a specific magnitude, causes a pivoting of the bell-crank lever as a result of which the toggle joint sharply breaks and disengages the clutch.

---

The invention relates to an overload clutch for machine tools, particularly for lathes.

An object of the invention is to provide a construction for an overload clutch which may be engaged and disengaged with relatively small forces and which operates in accordance with a predetermined value of the overload force so that when such overload exceeds such predetermined value the clutch is disengaged reliably automatically.

A further object of the invention is to provide a construction of an overload clutch wherein a proportionate small displacement of an element of the clutch automatically disengages it and the size of the required displacement of such element for the uncoupling is adjustable so that the sensitivity may be regulated.

A further object of the invention is to provide a construction for an overload clutch operable by a lever for the engagement and disengagement of the clutch and such lever has a position in which the clutch is disengaged as well as two positions in which said clutch is engaged.

With the above and other objects in view which will become apparent from the detailed description below, a preferred embodiment of the invention is shown in the drawings in which.

Figure 1:
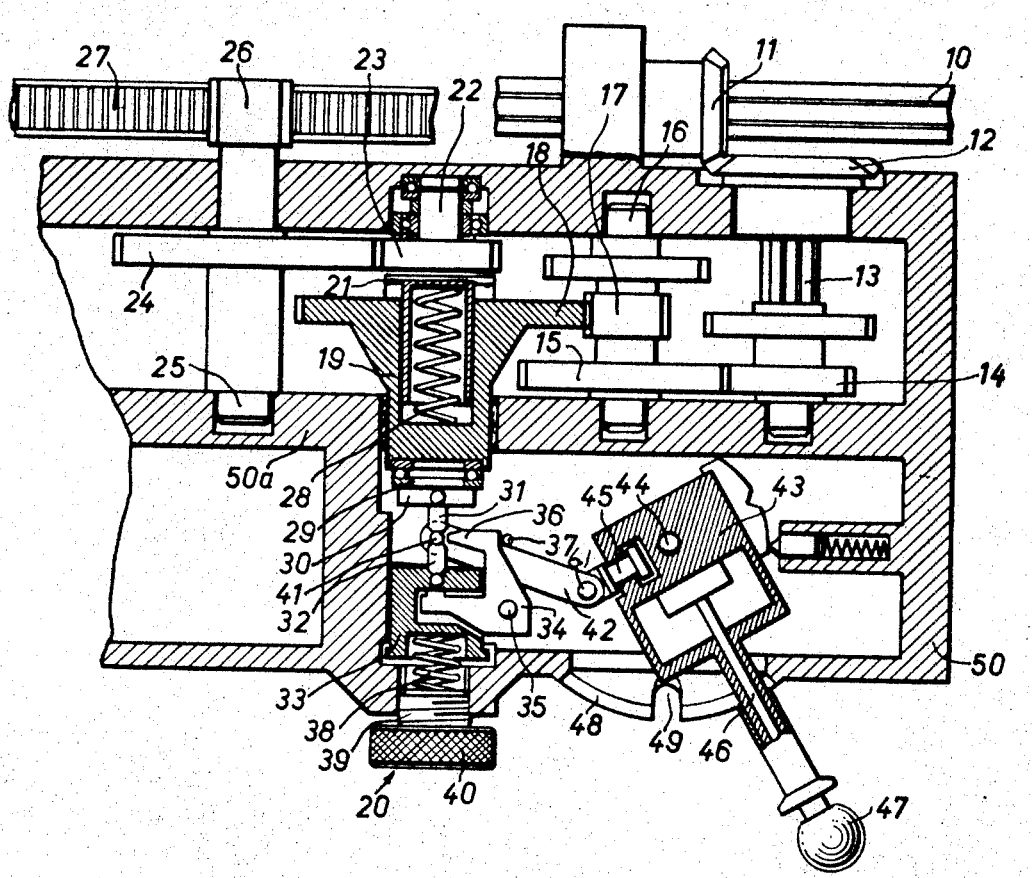
FIGURE 1 shows a horizontal section on the line I—I in FIGURE 3 through an apron of a lathe.

According to FIGURE 1, a shaft 10, which is hexagonal in cross section and on which a bevel gearwheel 11 is mounted for displacement, is provided for the feed drive of the apron. This bevel wheel 11 is in mesh with a second bevel wheel 12 which is keyed on to a shaft 13 mounted perpendicular to the drive shaft 10. Mounted on the shaft 13 so as to be held against rotation but to be axially displaceable is a spur gearwheel 14 which is in mesh with a second spur gearwheel 15 which is keyed on to a shaft 16 mounted parallel to the shaft 13 in the apron.

Further keyed on shaft 16 is a pinion 17 which is in mesh with a spur gearwheel 18. This spur gearwheel 18 is integral with a first clutch member 19 of an overload clutch indicated generally at 20 for the longitudinal feed. So-called Hirth-type teeth are provided at the end face of the clutch member 19 and engage with corresponding teeth on a second clutch member 21 of the overload clutch 20. This second clutch member 21 is integral with a shaft 22 of the overload clutch 20. Keyed on to the shaft 22 is a pinion 23 which is in mesh with a gearwheel 24.

The gearwheel 24 is held against rotation on a shaft 25 to which there is further secured a pinion 26 which is in mesh with a rack 27. The rack 27 is secured to the frame, not illustrated, of the lathe on which the apron is mounted for displacement. The displacement of the apron is effected through the drive of the hexagonal shaft 10 which, through the gears described, 11, 12; 14, 15; 17, 18 and 23, 24, drives the pinion 26, which is in mesh with the stationary rack 27, as a result of which the apron is displaced in relation to the rack 27 and hence in relation to the frame of the lathe.

If the apron travels against a stop, not illustrated, or if the resistance to the feed of the apron exceeds a given adjustable value for any reason, the above-mentioned overload clutch 20 is disengaged. The tubular and lower portion of the shaft 22 is mounted for rotation and axial displacement in the first clutch member 19 which is likewise mounted for rotation and displacement in the wall 50a of the housing 50. A spring 28, which bears on the one hand against the second clutch member 21 and on the other hand against the clutch member 19, tends to bring the two clutch members 19 and 21 out of engagement.

Figure 2:
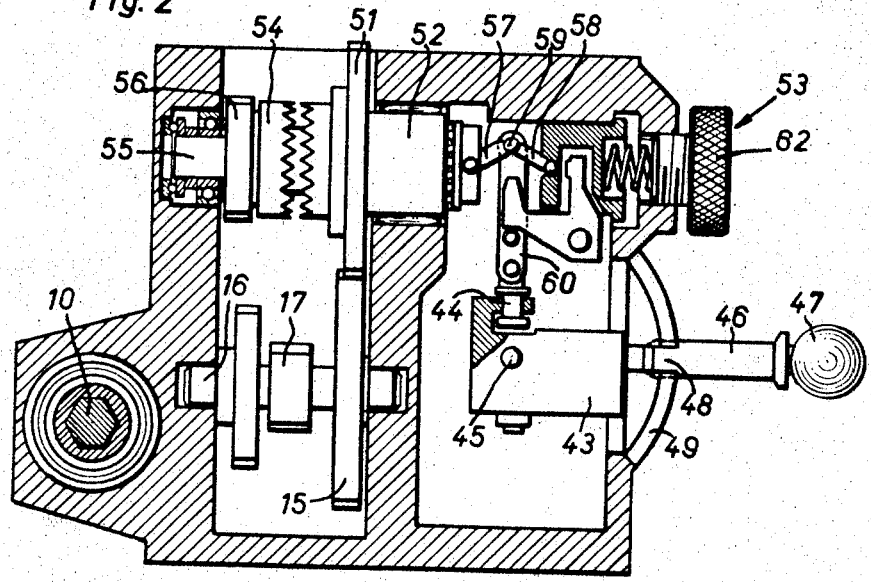
FIGURE 2 shows a horizontal section on the line II—II in FIGURE 3 through the apron illustrated in FIGURE 1

The axially displaceable clutch member 19 bears against a nonrotating pin 30 through a ball bearing raceway 29. A toggle joint, which consists of two levers 31 and 32 and which bears against a sliding member 33, is articulated to this pin 30. A bellcrank lever 34 is mounted for pivoting about a stationary spindle 35 and comprises a stop 36 which prevents the toggle joint 31, 32 from bending towards the right, as shown in FIG. 1. The pivotability of the bellcrank lever 34 in clockwise direction is limited by a stop 37. A spring 38, which bears on the one hand against the sliding member 33 and on the other hand against an adjustable screw 39, tends to pivot the bellcrank lever 34 in clockwise direction and to urge it against the stop 37. The screw 39 is rotatable by means of an adjusting knob 40 as a result of which the initial tension of the spring 38 is adjustable. A thread is provided on the adjusting knob for the rotation of the screw 39 so that the screw 39 is displaced axially on rotation of the adjusting knob. Articulated to the hinge point 41 between the two levers 31 and 32 of the toggle joint is a link 42 which in turn is articulated, through a pin 45 to a control member 43 which is pivotable respectively in a horizontal or in a vertical plane about two pins 44 and 45, perpendicular to one another, the pin 44 being articulated to a link 60 as shown in FIGURE 2. Secured to this control member 43 is an actuating rod 46 with a control knob 47 which is pivotable respectively in a horizontal slot 48 and in a vertical slot 49 in the apron casing 50.

As shown in FIGURE 2, the above-mentioned spur gearwheel 15, which is keyed onto the shaft 16 and is driven by the gearwheel 14, is in mesh with a further gearwheel 51 which is secured to a first clutch member 52 of a second overload clutch indicated generally at 53 for the feed of the cross slide. This second overload clutch 53 is constructed in precisely the same manner as the first overload clutch 20 just described for the longitudinal feed. The description of this second overload clutch 53 can therefore be less detailed. A second clutch member 54, which is likewise in engagement with the first clutch member through so-called Hirth-type teeth, is keyed on to a shaft 55 and rigidly connected to a gearwheel 56 which is adapted for the drive of the cross slide not illustrated.

Figure 3:
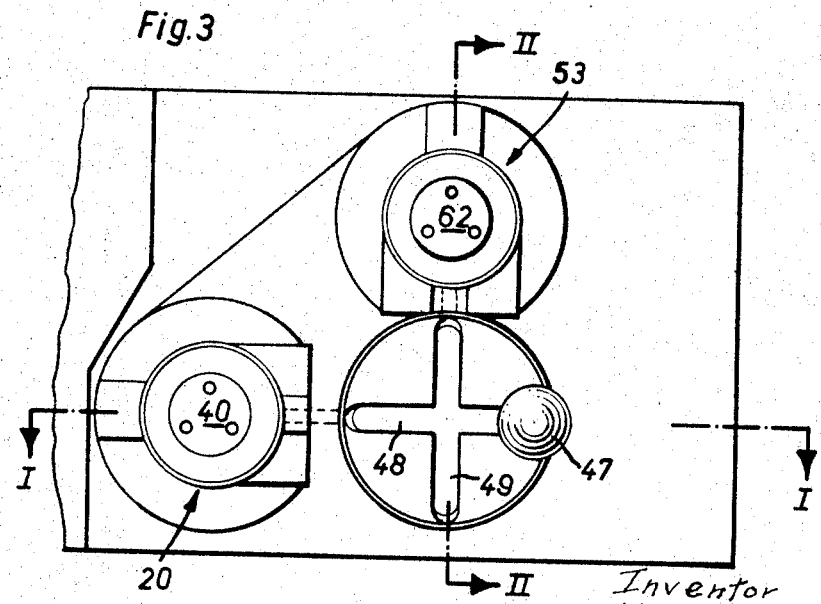
FIGURE 3 shows a front view of the apron illustrated in FIGURES 1 and 2.

The second overload clutch 53 likewise comprises a toggle joint, consisting of the two levers 57 and 58. Articulated to the hinge point 59 between the two levers 57 and 58 is a link 60 which, in turn, is articulated to the same control member 43 as the link 42 of the first overload clutch 20. The second overload clutch 53 can thus be engaged and disengaged with the same actuating rod 46 with the control knob 47 as the first overload clutch 20. For the engagement and disengagement of the first overload clutch for the cross slide, the actuating rod 46 is pivoted in the horizontal slot 48 in the apron casing 50, and for the engagement and disengagement of the second overload clutch 53, the actuating rod 46 is pivoted in the vertical slot 49 in the apron casing 50. When the actuating lever is at the point of intersection between the two slots 48 and 49, both clutches are disengaged. This position can be seen from FIGURE 3. With this arrangement, only the one or the other of the two overload clutches 20 and 53 can be engaged; but not both simultaneously.

The mode of operation of the device described is as follows:

Both the drive of the cross slide and the drive of the longitudinal slide are effected in known manner by means of the so-called feed rod which, in the present example, is the hexagonal shaft 10. This hexagonal shaft 10 is driven, in known manner, from the gearbox, not illustrated, of the machine tool and drives, through the two bevel wheels 11 and 12 and the shaft 13, the gearwheel 14 which, in turn, during the longitudinal feed, drives the gearwheel 18 through gearwheel 15, shaft 16 and pinion 17. The gearwheel 18 transmits a torque through the two clutch members 19 and 21 of the first overload clutch 20 to the pinion 23. The pinion 23 drives the pinion 26 through gearwheel 24 and shaft 25, as a result of which the apron is displaced in relation to the rack 27.

If the torque, which has to be transmitted by the first clutch member 19 to the second clutch member 21 exceeds a specific adjustable value, then a component of force arises which tends to bring the two clutch members 19 and 21 mutually out of engagement. This component of force is transmitted through the toggle joint 31, 32 and through the slide member 33 to the spring 38 and causes a compression of the spring 38. On the compression of the spring 38, the bellcrank lever 34 is pivoted in counterclockwise direction and the stop 36 of the bellcrank lever 34, against which the toggle joint to bend it sharply. As a result of the sharp bending of the toggle joint 31, 32, the spring 28 can relax, in the course of which it brings the two clutch members 19 and 21 out of engagement, as a result of which the drive is interrupted and the apron comes to a standstill.

The magnitude of the torque transmitted through the overload clutch can be determined by means of the adjusting knob 40. The initial tension of the spring 38 can be increased or reduced by turning the adjusting knob 40 so that a greater or smaller component of force is necessary in order to pivot the bellcrank lever 34 in counter clockwise direction so that the toggle joint 31, 32 is bent sharply. Since the torque which can be transmitted by the overload clutch is always proportional to the component of force which is necessary to bend the toggle joint 31, 32 sharply, the torque which can be transmitted also varies when the initial tension of the spring 38 is varied.

As can be seen from FIGURES 1 and 2, the two overload clutches are disengaged when the actuating lever 46 is at the point of intersection between the two slots 49 and 48. The point of articulation 61 of the link 42 on the control member 43 describes an arc about a vertical pivotal axis through pin 44 during the pivoting of the control member 43. Thus the actuating lever 46 can be pivoted out of its mid position either towards the right, as illustrated in FIGURE 1, or towards the left in order to engage the overload clutch. In both cases, the toggle joint 31, 32 is pivoted by the link 42 into the extended position illustrated in which the hinge point 41 bears against the stop 36 on the bellcrank lever 34.

The same applies to the second overload clutch 53. This is likewise disengaged when the actuating lever 46 is in its mid position and can be pivoted upwards, as illustrated in FIGURE 2, or downwards for the engagement. Again, in both cases, the toggle joint 57, 58 is pivoted, by the link 60, into the elongated position illustrated.

During the feed of the cross slide, the drive is likewise effected from the hexoganal shaft 10 through the bevel gear 11 and 12, the shaft 13 and the gearwheels 14 and 15. The gearwheel 15 drives the gearwheel 51 secured to the first clutch member 52 of the overload clutch 53. This gearwheel transmits a torque through the two clutch members 52 and 54 of the second overload clutch 53 to the gearwheel 56 which drives the cross slide, not illustrated. The maximum permissible torque can be varied by means of the adjusting knob 62 in accordance with the particular requirements in the same manner as with the first overload clutch.

In order to increase or reduce the response sensitivity of the overload clutch as described, the stop 37, which limits the one end position of the bellcrank lever 34, may be adjustable in construction as a result of which the necessary amount by which the bellcrank lever 34 has to pivoted out of its end position in counter clockwise direction in order that the toggle joint 31, 32 may bend sharply, can be set greater or less. The stop 37 may be mounted eccentrically, for example.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. An overload clutch for machine tools comprising a casing, two clutch parts having clutch surfaces within said casing, an axis about which said parts are rotatable and from which one clutch part is displaceable, said surfaces being inclined toward said axis to produce an energy component effective in an axial direction by the energy transmitted by the clutch, a connecting piece, a toggle switch joint having a first lever pivoted to said displaceable clutch part and having a second lever which on one hand is pivoted to said first lever and on the other hand to said connecting piece, a spring supported on one hand on said casing and on the other hand on said connecting piece urging said displaceable clutch part against said other clutch part, a pivotally mounted bellcrank lever within said casing connected to said connecting piece which during a displacement of said connecting piece under the effect of said energy component breaks said toggle switch joint against the force of said spring for disconnecting said clutch.

2. An overload clutch as claimed in claim 1 wherein an adjusting member is provided which limits the pivotal range of said bellcrank lever in one direction and determines the position of said bellcrank lever when the clutch is engaged.

3. An overload clutch as claimed in claim 1 wherein a second spring which is weaker than said first named spring is supported on said clutch parts and urges said two clutch parts away from each other.

References Cited

UNITED STATES PATENTS

| | | | |
|---|---|---|---|
| 975,846 | 11/1910 | Fensom | 192—56 |
| 1,512,760 | 10/1924 | Hancock | 192—56 |
| 2,887,921 | 5/1959 | Livermont | 192—56 XR |
| 3,245,230 | 4/1966 | Denzin | 192—56 XR |

FOREIGN PATENTS 620,377  10/1935  Germany.

BENJAMIN W. WYCHE III, *Primary Examiner.*

LESLIE J. PAYNE, *Assistant Examiner.*

U.S. Cl. X.R.

192—89